April 19, 1966  F. J. JENNY  3,246,888
APPARATUS FOR GENERATING SYNTHESIS GAS
Filed July 27, 1964  2 Sheets-Sheet 1
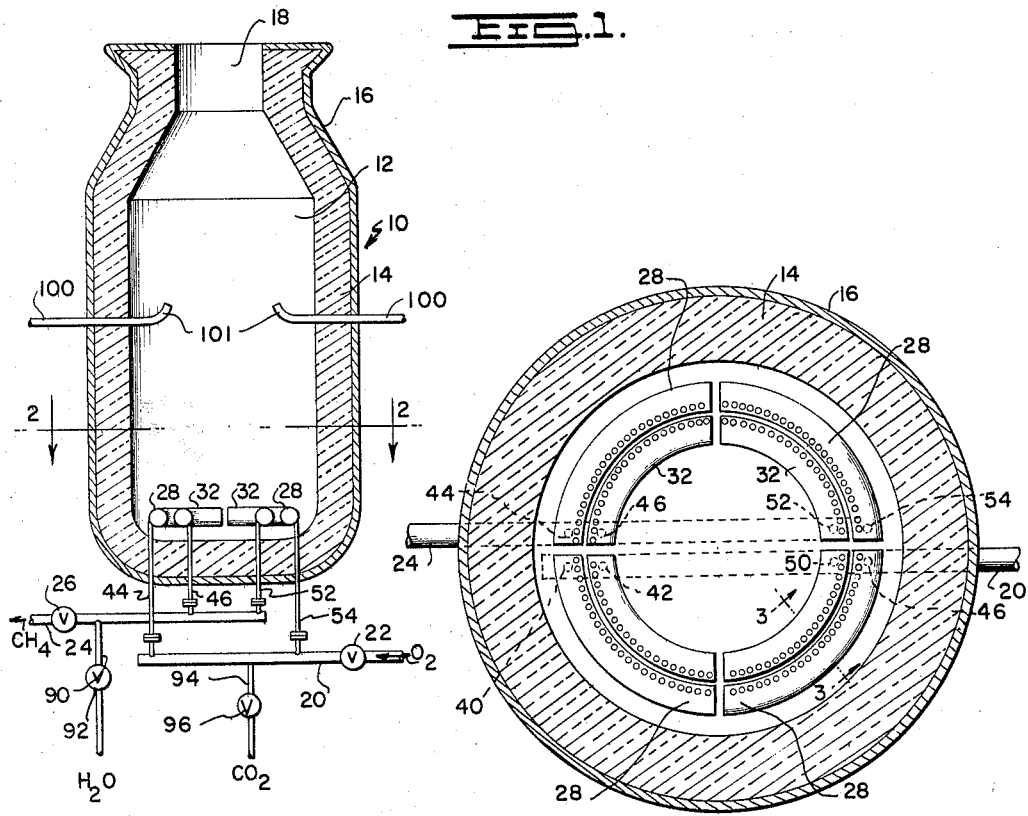
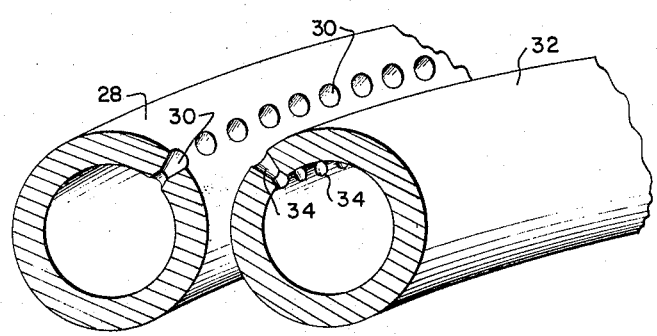
INVENTOR
FRANK J. JENNY
BY *Wynne & Finken*,
ATTORNEYS April 19, 1966   F. J. JENNY   3,246,888
APPARATUS FOR GENERATING SYNTHESIS GAS
Filed July 27, 1964   2 Sheets-Sheet 2

INVENTOR
FRANK J. JENNY

BY *Wynne + Finken*
ATTORNEYS

# 3,246,888
APPARATUS FOR GENERATING SYNTHESIS GAS
Frank J. Jenny, 460 W. 24th St., New York 11, N.Y.
Filed July 27, 1964, Ser. No. 386,484
9 Claims. (Cl. 266—28)

This invention relates to an improved apparatus for producing synthesis gas.

This application is a continuation-in-part of my prior copending application Ser. No. 76,269, filed December 16, 1960, now abandoned, which is a continuation-in-part of my prior copending application Ser. No. 305,940, filed August 23, 1952, now abandoned.

Synthesis gas is a mixture of carbon monoxide and hydrogen which is appropriate as a charge to a synthesis process for the production of hydrocarbons and the like. The synthesis gas, furthermore, is a ready source of hydrogen or carbon monoxide for use in other chemical processes. The mixture, furthermore, is an excellent reducing gas advantageously employable in the direct reduction of iron ore. The generation of synthesis gas by the partial oxidation of hydrocarbons, and particularly gaseous hydrocarbons, by oxygen of high purity at elevated pressures and at elevated temperatures is known to the art. I have found that the partial oxidation process under appropriate process conditions may be substantially completed in less than a second, and that the process requires no catalyst. I have found, further, that the shape of the reaction zone, that is, the relationship between the surface area of the reaction zone and its volume, does not substantially affect the process, as set forth in Eastman et al., U.S.P. 2,582,938. By way of distinctive contrast, I have found that the unparallel problems encountered in the partial oxidation process are basically concerned with the method whereby the partial oxidation reaction is caused to take place. First, as will be more specifically set forth hereinafter, the method must ensure very rapid and complete mixing of the reactants. Second, the reaction between the hydrocarbon and oxygen must take place in a suitable reaction zone entirely away from and without impingement of the extremely high temperature reacting gases on the reactant nozzle structures. In addition the stated reaction zone must be free of any construction whereby eddy current mixtures of the reactant gases burn on the nozzle structures, which thereby act as flame-holders, or whereby free carbon from the pyrolytic fracking of the hydrocarbon becomes critically encrusted on the nozzle structures and reactant ports. These same discoveries have subsequently been made in the separate investigation of Eastman as noted in the specification of U.S.P. 2,838,105 and others. The prior art patent teaches that when the residual methane content is in the range above 4.5 percent, the amount of soot formation becomes intolerably excessive, resulting in costly equipment failures. Practically speaking, the residual methane is controlled to within a fraction of a percent, preferably in the range of 0.2–0.3 percent, and approaching 0.0 percent.

A plant employing the method of the prior art with the partially oxidation of gaseous hydrocarbons for the generation of the synthesis gas has been built by Carthage Hydrocol at Brownsville, Texas. This plant has been unable to operate continuously and has, during its periods of intermittent operation, operated at only a fraction of its designed capacity. The difficulty has been occasioned in the synthesis gas generators where partial combustion of methane with substantially pure oxygen under conditions for optimum generation of synthesis gas has resulted in repeated burnouts of the generator jets.

The reaction for the partial oxidation of methane may be represented as follows:

$$CH_4 + \tfrac{1}{2} O_2 \rightarrow 2H_2 + CO + 10{,}000 \text{ B.t.u.}$$

If there is excessive oxygen present, two reactions occur. First, we have the complete oxidation of methane which may be represented as follows:

$$CH_4 + 2O_2 \rightarrow CO_2 + 2H_2O + 345{,}000 \text{ B.t.u.}$$

It will be noted that there is a tremendous heat generated by this highly exothermic reaction. The arrangement of the generator jets in the prior art is such that there is always present in the reaction chamber a local excess of oxygen permitting the highly exothermic reaction of complete oxidation of the hydrocarbon to occur. The heat thus generated is the cause of the difficulty being experienced at the Brownsville, Texas, Hydrocol plant. There is an additional side effect created by permitting the complete oxidation of methane to occur. The local reduction in the oxygen present by the overuse of some of it results in a local oxygen deficiency with the result that some of the methane of the charge will product free carbon, as follows:

$$CH_4 \rightarrow C + 2H_2$$

The carbon dioxide present will produce a synthesis gas mixture by the following reaction.

$$CO_2 + CH_4 \rightarrow 2CO + 2H_2$$

The deleterious effects of the local excess of oxygen and the accompany exothermic complete oxidation of methane caused thereby will produce the excessive heat which causes the metal of the generator jets to burn out. In addition, free carbon is formed.

It will be seen that a complete, continuous and rapid commingling of the reactant gases is necessary if a sustained continuous production of syntheis gas is to be obtained unaccompanied by the deleterious effects pointed out above. The gases cannot be premixed before entering the reaction zone since flash backs will always occur if this be attempted. The gases cannot be mixed until they reach the reaction zone and then their commingling must take place through an extended area within the reaction zone. In this manner, local excesses of oxygen are prevented and the deleterious highly exothermic complete oxidation of methane will not occur to any substantial degree.

In general, my invention contemplates preheating the reactant gases to a temperature of about 1000° F. The hydrocarbon may be a mixture of hydrocarbon gases or may be a liquid hydrocarbon, if desired. In the case of liquid hydrocarbons, the average reaction may be represented by the equation:

$$C_nH_{2n} + \tfrac{n}{2} O_2 \longrightarrow nH_2 + nCO$$

The oxygen reactant should have a high purity, preferably of better than 80 percent, though the process may operate with an oxygen content of at least 40 volumes percent of free oxygen. The preheating temperature in the case of liquid hydrocarbons will be sufficient to vaporize them so they may be considered as gaseous hydrocarbons for the purpose of my process.

The reaction time is substantially independent of pressure, being completed in much less than one second, provided the intermixing, which will be pointed out more fully hereinafter, is practiced. Any apropriate pressure may be employed in the synthesis reactor, depending upon the pressure of the after reaction zones to which the synthesis gas is to be charged. A pressure between two hundred pounds per square inch and four hundred pounds per square inch is appropriate, though pressures ranging from atmospheric pressure to pressures as high as seven hundred and fifty pounds per square inch or higher may be employed. The temperature within the reaction zone should be maintained between 1800° F. and 3000° F. The best results are obtained by maintaining the temperature in the vicinity of 2300° F. This temperature is maintained by controlling the relative rate of flow of oxygen with respect to the methane and the combined rate of flow of both reactants as well as the degree of preheat. It was seen above that the desired reaction is not highly exothermic and when the proper rates of flow are achieved a temperature of 2300° F. gives optimum process results. If the temperature is much below 1800° F., the synthesis gas contains increased quantities of methane. If the temperature of 3000° F. is exceeded, burnouts are apt to take place and too large a percentage of carbon dioxide will appear in the final product as well as concomitant free carbon. With the aid of my method proper conditions can be readily achieved by adjusting the relative flow of oxygen to the methane and a stable, continuous process condition can be readily achieved. Increasing the quantity of oxygen increases the temperature. Decreasing the quantity of oxygen reduces the temperature. The exothermic heat of the desired reaction will furnish sufficient heat to maintain the temperature at a substantially constant point.

The preheated reactant gases are introduced through a plurality of comparatively minute jets over an extended area within the reaction zone in such manner that the reactant gases are jetted against each other and commingled to permit the reaction to take place over an extended area within the reaction zone and thus avoid local excesses of oxygen which lead to the deleterious results outlined above.

In the accompanying drawings which form part of the instant specification and which are to be read in conjunction therewith and in which like reference numerals are used to indicate like parts in the various views.

FIGURE 1 is a diagrammatic sectional view of a reactor containing one embodiment of the apparatus utilizable in the process of my invention;

FIGURE 2 s a sectional view drawn on an enlarged scale taken along the line 2—2 of FIGURE 1;

FIGURE 3 is a fragmentary sectional view drawn on an enlarged scale taken along the line 3—3 of FIGURE 2;

Figure 4:
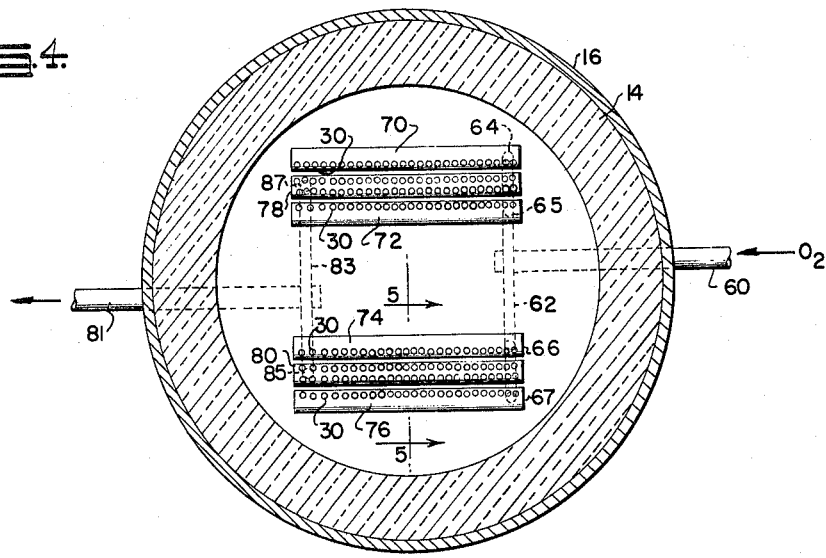
FIGURE 4 is a sectional view similar to FIGURE 2 showing another form of apparatus capable of carrying out the process of my invention.

Referring now to the drawings, the reactor, indicated generally by the reference numeral 10, may have any desired shape or size dictated by the volume of gases to be processed. The rate of flow of gases and the size of the reaction chamber are such that the gases pass through the reaction zone in less than one second. The chamber 12 of the reactor is lined with a refractory lining material 14 housed by a metal casing 16. In starting up the gas generator, any suitable means such as a pilot light or burner may be used. Or, the reactants may be preheated to a temperature above the ignition temperature to give spontaneous ignition on contact. In operation, these auxiliary means are not required. The hot refractory lining of the generator, at an elevated temperature level corresponding to the temperature of the partial oxidation reaction, radiates energy as a means for continuing the partial oxidation reaction. It is understood, of course, that heat-exchange coils (not shown) may be positioned in the path of the gases emerging through the outlet port 18 to utilize some of the heat of the reaction, if desired, as is well understood in the art. Oxygen from any suitable source is preheated in a preheater (not shown) and introduced into a supply manifold 20 controlled by a value 22, as also shown in Fruit U.S.P. 2,672,849. The causes of failure in the Fruit commercial generator were two-fold. The arrangement of the burners failed to give intimate and instantaneous commingling of reactants, resulting in both localized excesses of oxygen and of fuel. The localized excesses of oxygen produced excessively high temperatures, and the hot reacting gases impinging on the nozzle tips caused repeated burnout failures. The corresponding localized excesses of fuel resulted in high residual methane and excessive soot formation. The excessive soot clogged portions of the generator and the waste heat boiler which is an integral part of the generator, necessitating shutdowns and equipment repairs. The waste heat boiler in the commercial unit is an essential part of the process not only to give required heat economy, but also to generate steam for driving the compressors and pumps of the oxygen unit and other auxiliary process facilities. The hydrocarbon reactant, similarly preheated, is introduced into a supply manifold 24 controlled by a valve 26. Adjacent the bottom of the reaction zone and appropriately supported therein I provide a plurality of nozzle manifolds 28 formed with a plurality of nozzles 30, as can readily be seen by reference to FIGURE 3. Adjacent each of the nozzle manifold sections 28 I position a second plurality of nozzle manifolds 32 similarly provided with nozzle 34. By reference to FIGURE 3 it will be seen that the nozzles 30 are in apposition with the nozzles 34. It will be further observed that both the nozzles 30 and 34 are advantageously formed of converging diverging shape so that the pressure energy existing within the manifold will be converted into velocity energy in jetting through the nozzles. The jetted gases from the juxtaposed nozzles directed toward each other will intimately commingle, commencing the reaction. The intimate commingling of the gases through a plurality of comparatively small nozzles accomplishes the unexpected and desirable result in a simple, convenient manner. The number of nozzles is substantially critical. In the Brownsville operation referred to above, only eight nozzles were employed in what are known as "burners." Actually, I do not employ my nozzles are "burners." With the use of eight nozzles in Brownville each nozzle must handle 12½ percent of the total gas flow. I have found that no nozzle should handle more than 3 percent of the gas flow and that it is preferable that no one nozzle should handle more than 1 percent of the gas flow. Optimum results can be obtained by having a sufficient number of nozzles so that each nozzle will handle between ½ percent and 1½ percent of the gas flow. For example, with the reactor as shown in FIGURE 1 having an internal diameter of 6½ feet, a quantity of 86,400,000 standard cubic feet per day of natural gas can be charged. This gas will be preheated to a temperature of 1000° F. and the pressure within the reaction zone is to be maintained at three hundred pounds to the square inch. Employing nozzles having an outlet diameter of three-quarters of an inch disposed along a circle having a diameter of approximately five feet, with the nozzle centers spaced one inch apart, one hundred and fifty-three nozzles for the natural gas are provided in the nozzle manifolds 28 adapted to jet the natural gas into the reaction zone. Thus, each nozzle will handle .65 percent of the total quantity of the natural gas charged. The manifolds may be made of stainless steel, the diameter of the nozzle manifolds being approximately six inches. Gas from the supply manifold is led to the nozzle manifolds through pipes 40, 42, 44, 46, 48, 50, 52 and 54. It is to be understood, of course, that the transfer pipes 40 to 54, inclusive, may enter the nozzle manifolds at any appropriate position. The pressure existing in the manifold is such that a substantially equal flow is achieved through each of the respective nozzles 30 and 34. If desired, a plurality of transfer pipes may be provided between the supply manifolds and the nozzle manifolds, as will be understood by those skilled in the art.

By the arrangement just described, the plurality of nozzles in apposition insure an intimate commingling of the reactant gases within the reaction zone, permitting the reaction to take place over an extended area under proper process conditions. In this manner, local excesses of oxygen are avoided and the highly exothermic complete oxidation of the methane is minimized. As a result of my method and apparatus the partial oxidation reaction of methane to produce synthesis gas may proceed continuously over long periods of time without danger of burning out the nozzles. The arrangement and method are such as to insure direct and substantially instantaneous commingling of the reactants. This establishes process conditions so that the reaction will take place stoichiometrically to produce the desired primary reaction, that is, the direct partial oxidation of the hydrocarbon to carbon monoxide and hydrogen in a manner to minimize the undesirable secondary reaction. Thus, excessive amounts of carbon dioxide, with the accompanying inordinate heat concomitant to complete oxidation, are avoided. Similarly, the cracking of portions of the hydrocarbon feed to form solid carbon is likewise minimized.

Referring now to FIGURE 4, another form of apparatus capable of carrying out my process is there shown. It will be observed that the oxygen supply manifold 60 supplies oxygen through feeder manifold 62 through pipes 64, 65, 66 and 67 to the nozzle manifolds 70, 72, 74 and 76. The manifolds 70 and 72 are disposed on opposite sides of a methane nozzle manifold 78. Similarly, the manifolds 74 and 76 are disposed on opposite sides of a nozzle manifold 80. Methane from the supply manifold 81 passes through feeder pipe 83 and then through pipes 85 and 87 to the nozzle manifolds 78 and 80. It is to be understood that the pipes 85 and 87 may enter the nozzle manifolds at any appropriate point. The nozzle manifolds 72, 72, 74 and 76 are provided with single rows of nozzles 30 which are angularly directed toward the nozzle manifolds 78 and 80. These manifolds are provided with double rows of nozzles 34 in apposition with their companion nozzles. The arrangement can readily be seen by reference to FIGURE 5. Each pair of nozzles 30 and 34 is placed in apposition so that the jets of the reactants gases will provide a multiplicity of streams jetting against each other to produce direct and substantially instantaneous mixing of the reactants thus to insure a stoichiometric relation to produce the desired primary reaction in a manner similar to that described in relation to the apparatus shown in FIGURES 2 and 3.

Figure 6:
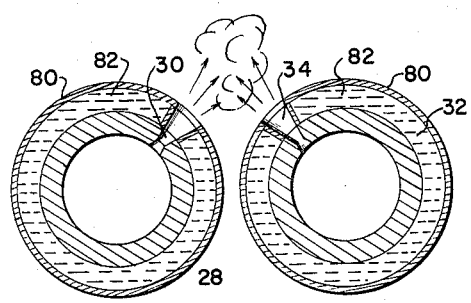
FIGURE 6 is a sectional view similar to FIGURE 3 showing a modified form of the apparatus utilizable in the process of my invention.

Each of the nozzle manifolds may be provided with a spaced jacket wall 80 to provide a jacket 82, as shown in FIGURE 6, to provide cooling of the metal. This insures that while proper process conditions are being achieved, temporary excesses of oxygen will not result in such high heat as to injure the nozzle manifolds. Similar unbalanced conditions resulting in excess $CO_2$ production may also result when shutting down the operation. During these periods the insurance provided by the cooling jackets is of advantage.

Figure 5:
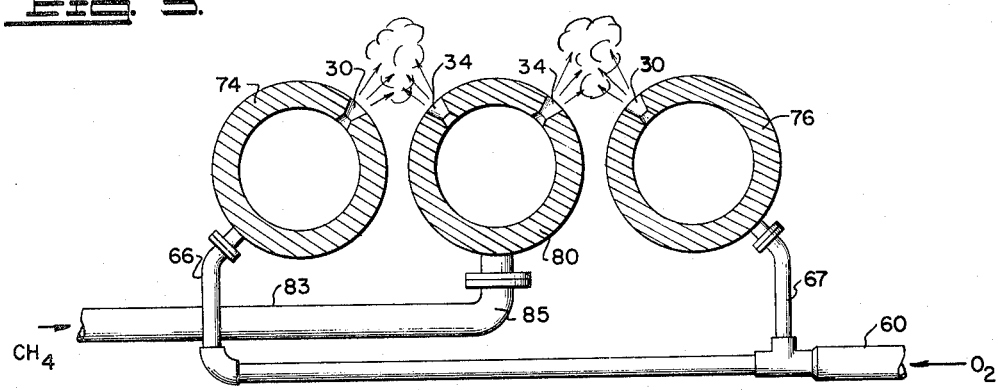
FIGURE 5 is a sectional view drawn on an enlarged scale viewed along the line 5—5 of FIGURE 4.

In the form of the apparatus shown in FIGURES 4 and 5, with the same reaction chamber as shown in FIGURE 1, with the same gas flow at a rate of 1000 standard cubic feet per second, the total area of the nozzles is about 67 square inches. With a pressure of 20 atmospheres and a temperature of 1000° F., the nozzles of one manifold will handle a flow of 140 cubic feet per second. Each nozzle will have an outlet area of .44 square inch, thus giving one hundred fifty-three nozzle pairs, enabling each nozzle pair to handle .65 percent of the total reactant flow.

Referring now to FIGURE 1, I have provided a pipe 90 controlled by a valve 92 adapted to control the delivery of steam from any suitable source into the methane supply manifold 24. In a similar manner pipe 94 communicates with a source of carbon dioxide and is adapted to deliver carbon dioxide to the oxygen supply manifold 20 under the control of the valve 96. If it is desired to produce a reducing gas, say for use in the direct reduction of iron ore, it is advantageous to have an excess of carbon monoxide for the reason that in the reduction of iron ore with carbon monoxide we have an exothermic reaction while the reduction of iron oxide with hydrogen is endothermic. It is desirable to operate the reduction shaft furnace at an elevated temperature and in order to maintain this temperature the generation of heat by the exothermic reduction is advantageous. In order to produce a mixture of carbon monoxide and hydrogen in which there is a greater proportion of carbon monoxide than hydrogen, I enrich the synthesis gas with carbon monoxide. I open the valve 96 to permit carbon dioxide to be added to the oxygen. The net reaction will be as follows:

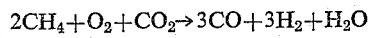
$$2CH_4 + O_2 + CO_2 \rightarrow 3CO + 3H_2 + H_2O$$

It will be seen that the partial oxidation of methane produces two volumes of hydrogen to one volume of carbon monoxide. In the reaction with carbon dioxide, however, the proportion of carbon monoxide with respecct to the hydrogen is increased.

The apparatus can also be employed when it is desired to produce a gas containing preponderantly hydrogen. This is done by introducing steam through pipe 90 into the methane manifold. The reaction is as follows:

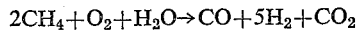
$$2CH_4 + O_2 + H_2O \rightarrow CO + 5H_2 + CO_2$$

The carbon monoxide and the carbon dioxide may be readily removed and pure hydrogen thus produced.

My apparatus is also applicable to the producing of synthesis gas from carbonaceous fuels such as fuel oil and coal, including all grades from sub-lignites to anthracite. In this case the coal, for example, is pulverized by grinding in a wet mill to form a slurry of finely divided coal and water in which the coal is present in an amount of from 40 percent to 60 percent by weight. The slurry is pumped through a heater and the comminuted coal and steam enters the reaction chamber at temperatures in the vicinity of 1000° F. The technology of fuel atomization is well known. In this case, the following series of reactions takes place:

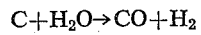
$$C + H_2O \rightarrow CO + H_2$$

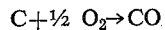
$$C + \tfrac{1}{2} O_2 \rightarrow CO$$

By the use of multiplicity of streams jetted against each other I avoid the undesirable complete oxidation of carbon to carbon dioxide and minimize the secondary reaction between steam and carbon monoxide to form carbon dioxide and hydrogen. These reactions are as follows:

$$C + O_2 \rightarrow CO_2$$

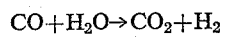
$$CO + H_2O \rightarrow CO_2 + H_2$$

It will be found that when using coal as a carbonaceous reactant that the output gas will have higher percentages of carbon dioxide present than when using gaseous fuel.

The apparatus described herein permits the production of synthesis gas substantially free of residual hydrocarbons, and, as required in synthesis operations, free of residual oxygen.

The extended surface of contact necessary for high specification purity synthesis gas as required for commercial operation is well illustrated by the arrangement of the plurality of pairs of respective apposite nozzles shown in FIG. 4, as supplemented in clearer detail in FIG. 5. The straight line rows of circular nozzles define elongated slot-type jets of the respective reactants, with a fully balanced equalized surface of contact for each reactant, the respective nozzles for each reactant balancing the corresponding nozzle for the other reactant, as shown in FIG. 5.

In this manner there is no stratification of an individual reactant on contact in the reaction zone. There are methods known to the art which have not anticipated this method. Thus, reactants have been jetted against each other with an unequalized surface of contact. In such methods, even with stoichiometric flow rates of reactants for producing 100% synthesis gas, there is a localized excess of oxygen at the surface of contact with the hydrocarbon. Accordingly, due to the extremely high rate of oxidation reactions, as set forth in Eastman et al., a substantial portion of the oxygen is consumed in total oxidation, rather than in partial oxidation.

Correspondingly, that portion of the hydrocarbon reactant which by-passes the surface of contact will stratify or peel away from the oxidation zone. The by-passed hydrocarbon is highly heated by radiation from the ball-of-flame oxidation reaction to cracking temperatures with formation of soot which has been shown to be an impediment in the operation of commercial generators.

Thus it is essential to avoid localized excesses of oxygen and of fuel at the surface of contact in generating high specification commercial synthesis gas.

In the arrangement as shown, the size of the circular nozzles is substantially critical. With small nozzles, instantaneous admixing of reactants is readily effected. With increase in nozzle size, the admixing becomes less efficient. To a limited extent, this may be counter-balanced by a higher oxygen flow rate with a higher oxidation reaction temperature, but with a lower oxygen efficiency. For larger nozzle sizes, that is circular nozzles with diameters greater than about three-quarters inch, the efficiency of instanteous admixing becomes critically ineffective, which was one of the contributing factors in causing failure at Carthage Hydrocol.

It will be understood that other arrangements of apposite nozzles may be practiced in defining the extended surface of contact, as will be known to those of skill in the art, consistent with the fundamental principles as herein set forth.

It will be observed that the arrangement of apposite nozzles is essentially different than in other methods known to the art. The method as practiced avoids impingement of the reactant nozzle structures with the hot reacting gases which progressively, and often dramatically leads to burnout failures.

In this respect it should be noted that in the partial oxidation of methane, the volume of the reaction products is twice that of the reactants. At the high reaction temperatures, this volume ratio is further mutliplied by a factor of about three, thus giving an actual product volume ratio of about six to one. With other hydrocarbons, the volume ratio is appreciably higher, being as high as ten to one, and higher.

Accordingly, at the surface of contact, there is a sudden expansion in volume of about six to one or higher. Accordingly, the partial oxidation reaction is effected completely away from the reactant nozzles to avoid impingement of the initial hot reacting gases on the reactant nozzle structures, either within the nozzle, or along the outside. As shown in the drawings, this is accomplished, together with intimate and instantaneous commingling of the reactants, by jetting the reactants together in a blunt or obtuse angle which is substantially less than a straight angle. Thus, each reactant is jetted in a substantially downstream direction of flow of the reacting gases, with the reaction products being removed at a distant point from the surface of contact of the reactants, again avoiding impingement of the reactant nozzle structures with hot reacting gases.

With a shallow angle of contact of jetted streams, the efficiency of instantaneous and intimate commingling of reactants decreases, progressively becoming critically ineffective to produce the required specification high purity synthesis gas essential to competitive commercial operation. This is a function which varies in degree with each hydrocarbon reactant. The higher hydrocarbons are more easily thermally cracked, and therefore are prone to higher rates of soot formation. Similarly, natural gas containing appreciable quantities of gaseous hydrocarbons heavier than methane will produce more soot than high purity methane. Therefore, the lower ranges of oblique angles of contact are generally inefficient and, depending on individual circumstances, critically defective, as may be separately determined by standard testing procedures.

In addition to the foregoing, there is no flame exposed burner surface in the terms oftentimes used in the technology, as in other apparatus known to the art but rather the zones surrounding and between the hydrocarbon nozzles and the oxygen nozzles is completely open and unrestricted as is apparent from the drawings. Thus, by way of illustration for purposes of clarification, in the past there have been attempts to use burners adopted from technologies other than synthesis gas. Typical of these are the so-called combustion channels of various types and flow patterns. The problems encountered are several. The individual reactants are admitted into the channel at velocities in excess of 100 f.p.s., corresponding to turbulence conditions of gale force or hurricane intensity. As dictated by economic considerations in the generation of high parity oxygen, there is a periodic rythmic imbalance in the oxygen flow, with a corresponding continual imbalance in stoichiometric relations of reactant streams, with corresponding pulses of total oxidation reactions. With high purity oxygen, the hypothetical instantaneous reaction temperature is above 10,000° F., or well above the vaporization temperature of metal of 5,500° F. These pulses which occur with explosive force are a constant source of mechanical failure of the chanel construction and a consequent explosion hazard typical of the unitary mechanical structure of the combustion channel arrangement.

There are further problems of critical distinction. A typical combustion channel will embody appreciable dead space backstream of the reacting components. Eddy currents of the reacting components will necessarily flow into this dead space where they will burn and consequently covert the nozzle structures into a flame-holder, with the burning occurring directly on the exposed metal surface. Alternatively, there is concomitant extensive cracking of the eddy current hydrocarbon with a consequent deposition of coke in the dead space. The coke becomes encrusted on the metal surface. Depending on various hydro-kinetic factors, the coke deposit grows by accumulation, eventually constricting the reactant port. Alternatively, portions of the encrusted coke will burn with oxygen, with the burning again taking place on the exposed metal surface, and again leading to direct mechanical failure.

The failures of the past are documented in public records. Maximum periods of operation have been limited to about forty days duration. The required shutdowns for repairs and other emergencies have generally exceeded the time period of operation, with a consequent operating time factor of less than 50%. Further, the operation has been restricted to capacities well below rated capacity, with a resultant overall operating efficiency well below 50%, which is far below required commercial operating standards.

With my apparatus, I am enabled to operate at fully rated capacity for periods in excess of 40 days. At shutdowns for maintenance inspection, it is evident from the lack of any signs of wear that the plant is entirely capable of operation for indefinite periods of time, corresponding to time efficiencies approximating 100% as essentially required for commercial utility. That this surprising result is newly attainable will be clearly evident from FIG. 5 which shows that the ball-of-flame representing the extremely high temperature initial reaction zone occurs at a distance entirely away from the nozzle structures, thus making burn-out failures of the prior art virtually impossible. Further, it will be evident from the chimney-effect hydro-kinetics of the arrangement, that there cannot be any back-stream dead-spaces where eddy currents of the reactants might occur with the consequent burning of the reactants on exposed metal surfaces or concomitant coke deposition as hereinbefore set forth. It will be understood that the ball-of-flame pattern will vary with particular circumstances, as known to combustion flame technology, particularly with atomized fuels. Further with such fuels which contain minor amounts of ash which tend to flux with the generator refractory walls, a suitable vapor shield may be adapted, as known to the technology.

The apparatus of my invention may be utilized for other reactions with but minor modifications. For example the free radical partial oxidation of hydrocarbons to acetylene may be accomplished. In such cases the products must be rapidly quenched as by water. Suitable means are shown in FIG. 1, wherein quenching fluid is delivered by pipes 100 to nozzles 101 in the reactor downstream from the fuel and oxygen nozzles. Additional reactions include the reduction of metallic ores, which may be fed to the reactor in finely divided form either with the oxygen stream or to the nozzle 101 dispersed in a suitable carrier gas, such as recycle synthesis gas. Advantageously, in a further adaptation, $TiO_2$ may be produced by conversion of $TiCl_4$ with $O_2$.

It has been set forth that my apparatus is suitable for the direct reduction of metal oxides. It is further advantageous for the production of alloys of improved properties whereby alloy source materials are pre-blended with the comminuted solids, as differentiated from the prior art. Dispersion type alloys are also contemplated.

It will be seen that I have accomplished the objects of my invention. I have provided an apparatus method for the generation of synthesis gas which will operate continuously at maximum capacity and high efficiency without repeated burning out of the reactant nozzles. By providing a multiplicity of nozzles whereby to jet the reactant streams in fractional finely divided jets I insure direct and instantaneous mixing of the reactants. Thus, the constituents of the feed will react in stoichiometric relationship to produce the desired primary reaction, that is, the direct partial oxidation of the carbonaceous fuel to carbon monoxide and hydrogen. My apparatus minimizes the undesirable secondary reactions, thus avoiding the formation of excessive amounts of carbon dioxide and steam which accompany complete oxidation. At the same time, the unbalance produced by complete oxidation is avoided, thus minimizing thermal cracking to form solid carbon.

While the invention has been described in terms of certain embodiments, they are to be considered illustrative rather than limiting and it is intended to cover all further modifications and embodiments that fall within the spirit and scope of the appended claims.

I claim:

1. A generator for the production of synthesis gas comprising an elongated housing carrying a refractory lining on the interior thereof, exit means for withdrawing reaction products positioned at one end of said housing, means for separately introducing streams of hydrocarbon and oxygen into the other end of said housing, said means comprising a hydrocarbon nozzle manifold and an oxygen nozzle manifold positioned adjacent thereto but uniformly spaced from each other, each manifold being provided with a plurality of nozzles so arranged that the plurality of hydrocarbon nozzles and the plurality of oxygen nozzles are directed toward each other at an angle whereby the plurality of streams of said hydrocarbon and said oxygen are directed along paths which converge on the paths of the other reactant streams within said housing at positions removed from the respective nozzles and in a direction of flow away from said nozzles, the zones surrounding and between said hydrocarbon nozzle manifold and said oxygen nozzle manifold being open and unrestricted.

2. An apparatus as in claim 1 in which said nozzles are directed generally toward each other and toward the exit end of said housing.

3. An apparatus as in claim 1 in which said adjacent nozzle manifolds are formed with at least thirty-four pairs of nozzles.

4. An apparatus as in claim 1 in which said nozzles are arranged in straight line rows, each row of nozzles defining an area of contact equal to the area of contact of the row of apposite nozzles.

5. An apparatus as in claim 1 in which said nozzle manifolds are formed by separate pipe conduits and in which said respective nozzles are arranged in circles.

6. A generator for the production of synthesis gas comprising an elongated housing carrying a refractory lining on the interior thereof, exit means for withdrawing reaction products positioned at one end of said housing, means for separately introducing hydrocarbon and oxygen into the other end of said housing, said means comprising a hydrocarbon nozzle manifold and an oxygen nozzle manifold positioned adjacent thereto but uniformly spaced from each other, each manifold being provided with a plurality of nozzles so arranged that the plurality of hydrocarbon nozzles and the plurality of oxygen nozzles are directed toward each other at an angle whereby the plurality of streams of said hydrocarbon and said oxygen are directed along paths which converge on the paths of the other reactant streams within said housing at positions removed from the respective nozzle systems whereby impingement of the jetted reacting gases on said reactant nozzles is avoided and the zones surrounding and between said hydrocarbon nozzle manifold and said oxygen nozzle manifold being open and unrestricted, whereby the nozzle system is free of any eddy-current flame-holding surfaces formed by said nozzle manifold structures.

7. An apparatus as in claim 6 in which said pairs of respective apposite nozzles comprise a non-flame-exposed burner arrangement.

8. A generator for the production of synthesis gas and acetylene comprising an elongated housing, exit means for withdrawing reaction products positioned at one end of said housing, means for separately introducing streams of hydrocarbon and oxygen into the other end of said housing, said means comprising a hydrocarbon nozzle manifold and an oxygen nozzle manifold positioned adjacent thereto but uniformly spaced from each other, each manifold being provided with a plurality of nozzles so arranged that the plurality of hydrocarbon nozzles and the plurality of oxygen nozzles are directed toward each other at an angle, said angle having an apex formed by the intersection of the flow direction from the respective nozzles which is remote from said nozzles, whereby hydrocarbon and oxygen are adapted to react over an extended area of contact in an unconfined zone remote from said nozzles, and in a direction of flow away from said nozzles, the zone surrounding and between said hydrocarbon nozzle manifold and said oxygen nozzle manifold being open and unrestricted, and means for directly quenching said reacting gases over an extended area of contact positioned between said nozzles and said exit means.

9. A generator for the production of synthesis gas and for the reduction of metal oxides comprising an elongated housing, exit means for withdrawing reaction products positioned at one end of said housing, means for separately introducing streams of hydrocarbon and oxygen into the other end of said housing, said means comprising a hydrocarbon nozzle manifold and an oxygen nozzle manifold positioned adjacent thereto but uniformly spaced from each other, each manifold being provided with a plurality of nozzles so arranged that the plurality of hydrocarbon nozzles and the plurality of oxygen nozzles are directed toward each other at an angle, said angle having an apex formed by the intersection of the flow directions from the respective nozzles which is remote from said nozzles, whereby hydrocarbon and oxygen are adapted to react over an extended area of contact in an unconfined reaction zone remote from said nozzles and in a direction of flow away from said nozzles, the zones surrounding and between said hydrocarbon nozzle manifold and said oxygen nozzle manifold being open and unrestricted, and means for directly injecting finely divided metal oxides into said reacting gases over an extended area of contact, said last-named means being positioned between said nozzles and said exit means.

References Cited by the Examiner

UNITED STATES PATENTS

| 2,582,938 | 1/1952 | Eastman et al. | 48—196 |
| 2,672,488 | 3/1954 | Jones | 48—196 |
| 2,840,149 | 6/1958 | Arnold | 48—196 |

JOHN F. CAMPBELL, *Primary Examiner.*

MORRIS O. WOLK, *Examiner.*